United States Patent [19]

Waddington

[11] 3,874,253
[45] Apr. 1, 1975

[54] WADDINGTON DRIVE

[76] Inventor: Clive Waddington, 180 Euclid Ave., Stratford, Conn. 06497

[22] Filed: May 31, 1973

[21] Appl. No.: 365,510

[52] U.S. Cl. ............... 74/804, 74/750 R, 74/750 B
[51] Int. Cl. .............................................. F16h 1/28
[58] Field of Search .......... 74/750, 751, 752 F, 804, 74/805, 535, 538, 570, 571, 750 B, 798, 200, 206; 192/6 A

[56] References Cited
UNITED STATES PATENTS
2,168,600  8/1939  Brown ............................. 74/750 B
3,324,746  6/1967  Kavi ................................. 74/804 X

*Primary Examiner*—Samuel Scott
*Assistant Examiner*—Frank H. McKenzie, Jr.
*Attorney, Agent, or Firm*—Charles M. Hogan; Gary M. Gron; Irwin P. Garfinkle

[57] ABSTRACT

An improved Waddington drive is positioned within a hub, such as a bicycle hub, and connected between the hub and an operator-powered sprocket. A series of planet gears are journalled for rotation in the rotating hub and all engage a fixed sun gear on a mounting shaft. The planet gears are connected by means of one-way clutches to a series of followers which engage a cam mounted on the sprocket so that it has a variable eccentricity. A coiled spring connected between the input sprocket and the cam varies the eccentricity in response to the torque reaction forces between the cam and the followers. This maintains the input-output ratio of the hub at a value enabling constant input torque irrespective of variations in output torque requirements.

22 Claims, 4 Drawing Figures

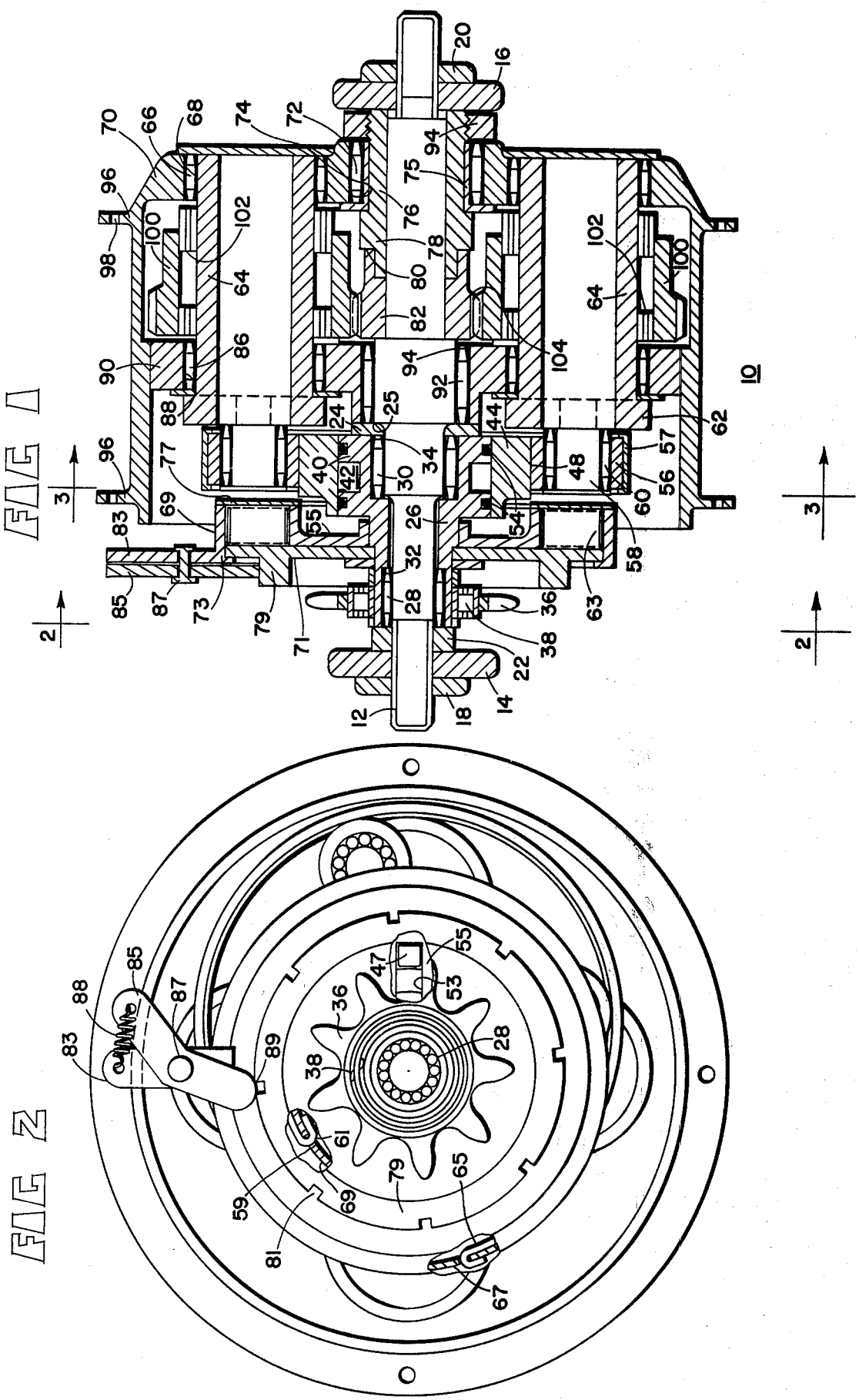

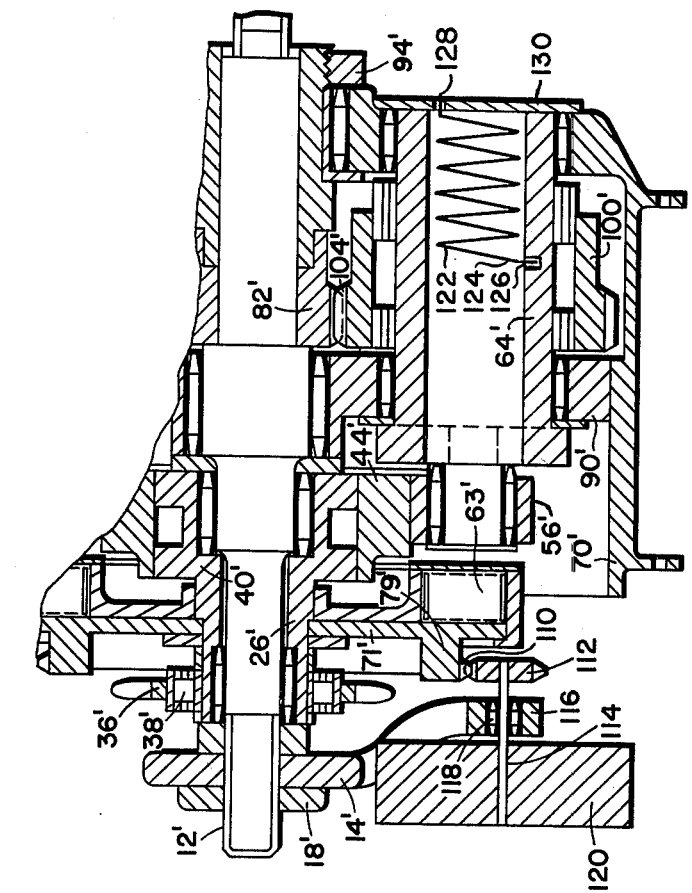
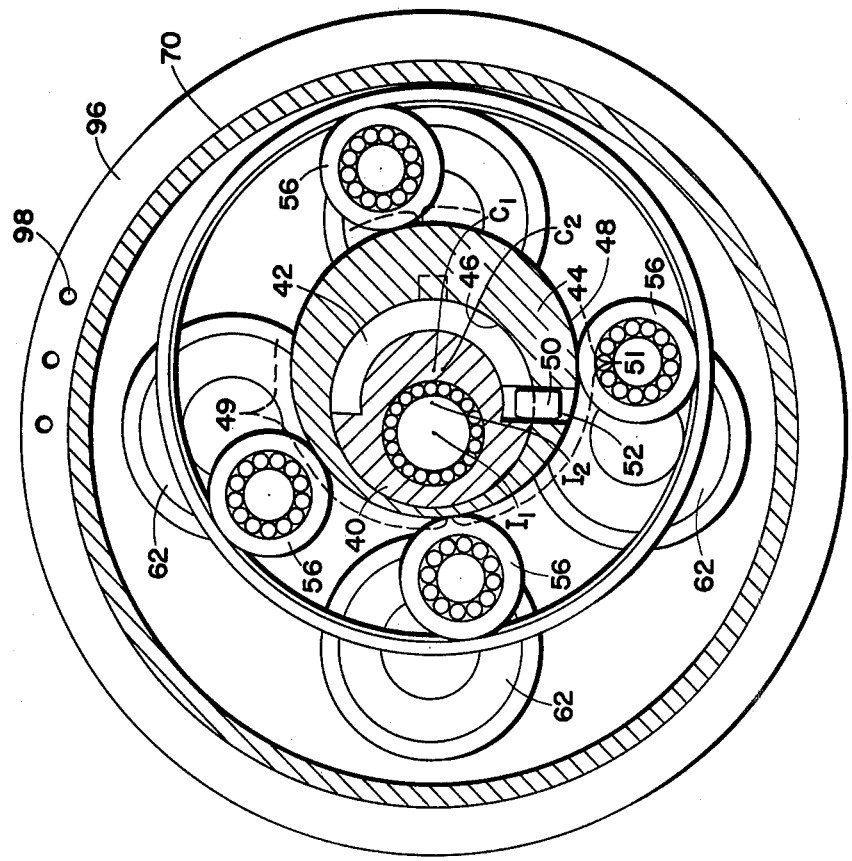

WADDINGTON DRIVE

BACKGROUND OF THE INVENTION

An important advance in the use of stepless variable stroke drives as automatic transmissions has been accomplished in the copending patent application to Clive Waddington, Ser. No. 275,221, now U.S. Pat. No. 3,803,932, filed on July 26, 1972, in which a Waddington transmission is described. Briefly, this transmission comprises a rotatable input sprocket having a cam plate with a variable degree of eccentricity. This cam plate reciprocates a series of followers on crank arms that are connected to a series of fixed gears through one-way clutches. A control system is connected between the input sprocket and the variable eccentricity cam so that the gear ratio maintains a selected input torque irrespective of output torque requirements. The above transmission does a highly effective job of automatically changing gear ratio with a simplified mechanical arrangement which can be easily incorporated in vehicle hubs, for example, a bicycle hub.

When the torque requirements for such a transmission are increased the primary limitation is that imposed by the one-way clutches between the shaft and the planet gears. When an outer hub dimension is limited there may be insufficient space in which to incorporate one-way clutches having a higher torque-carrying capability.

SUMMARY OF THE INVENTION

In its broader aspects the invention comprises a variable-stroke Waddington drive with at least one rotatable output element and a rotatable input element having a generally cylindrical cam. The cam is displaceable between a first position where its effective center is eccentric to the axis of rotation of the input element and a second position wherein its center is closer to the axis. A crank arm pivoted at one end has a follower at the other end which is reciprocated by the cylindrical cam. The follower has a stroke proportional in angular displacement to the distance of the effective center of the cam from the axis of rotation. A one-way clutch connects the crank arm to at least one planet gear journaled for rotation in the output element. The planet gear engages a fixed sun gear so that the pivoting cyclic movement of the crank arm causes the planet gear to orbit about the fixed sun gear and carry along the output element. A means responsive to the torque across the drive automatically displaces the cam means between the first and second positions in such a way that it controls the input-output ratio to maintain substantially a constant input torque.

The above and other related features of the present invention will be apparent from a reading of the description of the disclosure shown in the accompanying drawings and the novelty thereof pointed out in the appended claims.

In the drawings:

FIG. 1 is a longitudinal section view of a stepless variable-stroke Waddington drive embodying the present invention and installed in the hub of a pedal-powered vehicle with which it may be used;

FIG. 2 is an end view of the drive of FIG. 1, taken on line 2—2 of FIG. 1;

FIG. 3 is a cross-sectional view of the drive of FIG. 1 taken on line 3—3 of FIG. 1; and FIG. 4 is a fragmentary longitudinal view of a Waddington drive showing an alternate embodiment of the present invention.

Referring to FIG. 1 there is shown a variable-stroke drive 10 incorporated in a bicycle hub driven by an operator-powered pedal arrangement. It should be noted, however, that the drive may be used in other types of operator-driven devices, such as hoists, winches, etc. It may also be used for engine-driven devices with equal results.

The drive comprises a fixed central support shaft 12 removably secured to forks 14 and 16 of a bicycle (not shown) by nuts 18 and 20. The support shaft 12 journals an input element 26 by means of bearing assembly 28 and 30 positioned in bores 32 and 34, respectively, in the interior of input element 26. An input sprocket 36 is telescoped over input element 26 and connected to it through a one-way clutch 38. A washer 24, positioned against a shoulder 25 on support shaft 12, and a retaining nut 22 maintain the axial positioning of the input element 26.

As shown particularly in FIG. 3, input element 26 has an integral circular flange 40 whose center $I_2$ is offset from the axis of the input shaft $I_1$. The flange 40 has a peripheral groove 42 extending over a portion of the circumference of the flange 40. A cam plate 44 having a generally cylindrical outer form is journaled over flange 40 through an inner bore 46 whose center is offset from the mean center $C_1$ of the periphery 48 of the cam 44 by an amount which places the center of bore 46 coincident with center $I_2$ in the position illustrated in FIG. 2. The outer periphery 48 of cam plate 44 has different contours defined by two segments 49 and 51. Segment 51 has its center coincident with the mean center $C_1$ of the cam plate 44. Segment 49 has its center $C_2$ offset from the mean center $C$ so that the radius of curvature for segment 49 is greater than that for segment 51.

Cam plate 44 has a pin 50 extending inwardly through an opening 52 into the groove 42. The cam plate 44 can rotate relative to the flange 40 and the groove 42 limits the amount of rotation of the cam plate 44. As illustrated in FIG. 3, the range is 180° counterclockwise from the position shown. To damp the movement of the cam plate 44 relative to the flange 40, as will be described later, grease or other viscous material is placed in the groove 42 and a pair of O-rings 54 (see FIG. 1) provide circumferential seals to prevent the loss of grease from the groove 42.

As stated above, cam plate 44 can pivot in a counterclockwise fashion from the position shown in FIG. 3 to a second position wherein the pin 50 and 180° away. In the position shown the mean center $C_1$ of the cam plate 44 is eccentric with respect to the axis $I_1$ of the input element 26 by an amount equal to the distance $I_1$ $I_2$ + $I_2$ $C_1$. When the cam plate 44 rotates to the position 180° from the position of FIG. 2 the center $C_1$ of the cam plate 44 traverses a semicircular path counterclockwise to a point where it is substantially coaxial with the axis of rotation $I_1$ of the input element 26. It can be seen then that the eccentricity of the cam plate 44 relative to the input shaft 26 is varied by pivoting cam plate 44 relative to the flange 40 of input element 22.

The degree of eccentricity of cam plate 44 is controlled by a control system comprising a tab 47 integral with cam plate 44 (see FIG. 2). Tab 47 is received in a radially extending slot 53 of an annular actuator 55 journaled over input element 26. The periphery of actuator 55 has a slot 59 which receives the hooked inner end 61 of coiled spring 63 having a rectangular cross section. A hook 65 on the opposite end of spring 63 is received in a slot 67 of an annular ring 69 rotatably secured on a flange 71 by a lip 73 and a thin washer 77. Flange 71 is suitably fixed on input element 26. Flange 71 has an integral ring 79 preferably having a series of spaced notches 81 around its outer periphery. A radial tab 83 integral with ring 69 has an arm 85 pivotally mounted to it by pin 87. A spring 88 connected between the outer ends of tab 83 and arm 85 urges the inner end 89 of arm 85 into engagement with ring 79. As seen in FIG. 2, the spring 63 pulls annular actuator 55 clockwise relative to input element 26 and the reaction pulls ring 69 counterclockwise. Movement of ring 69 relative to flange 71 is resisted, however, by the friction of the inner end of 89 on ring 79. The notches 81 provide detents for the end 89 to increase the force holding the ring in a given position on flange 71, A series of rollers 56 abut the periphery 48 of cam plate 44 and are each journaled over a crank pin 58 by means of a bearing assembly 60. Each pin 58 is affixed to a crank arm flange 62 offset from the axis of rotation of an integral tubular shaft 64. Each shaft 64 is journaled at the end opposite the flange 62 by a bearing assembly 66 suitably retained in an opening 68 in an annular hub 70. The end of each shaft 64 adjacent crank arm flange 62 is journaled by a bearing assembly 86 suitably retained in a hole 88 in an annular frame 90. Frame 90 is secured to hub 70 to rotate with it.

A retaining ring 57 having a channel-shaped cross section contains the rollers 56 and maintains them in contact with cam plate 44. The followers 56 may be maintained against the exterior surface 48 of the cam plate 44 by the retaining ring 57, as herein shown, or by torsional springs mounted between shafts 64 and hub 70 to pivot the followers 56 against the cam plate 44.

The annular hub assembly 70 is journaled with respect to the fixed shaft 12 by a bearing assembly 72. Bearing assembly 72 is retained in a central opening 74 in hub 70 by a sleevelike retaining element 75 and a nut 94. Retaining element 75 is telescoped over a tubular element 76 having an integral flange 78 which abuts a shoulder 80 on a sun gear shaft assembly 82 telescoped over and suitably fixed with respect to shaft 12. Frame 90 is journaled with respect to support shaft 12 by a bearing assembly 92 received in central opening 94 in frame 90.

The outer periphery of hub 70 has integral flanges 96 which have suitable spoke-receiving holes 98 so that a spoked wheel may be mounted on the hub 90 in the usual fashion.

A series of planet gears 100 are mounted on shafts 64 through one-way clutches 102 so that the planet gears 100 all mesh with a fixed sun gear 104 integral with the sun gear shaft 82.

During operation of the drive described above, input element 26 rotates clockwise, as viewed in FIG. 2, at an input r.p.m. determined by the rate at which an operator pedals. The spring 63 urges annular actuator 55 in a clockwise direction so as to position the cam plate 44 in the position illustrated in FIG. 3 where its eccentricity is at a maximum. The eccentric movement of the cam plate 44 during rotation of input element 26 displaces the rollers 56 to pivotally reciprocate the shafts 64.

The one-way clutches 102 only permit the shaft 62 to be coupled to the planet gears 100 in a clockwise direction, as viewed in FIG. 3. Thus rotary movement to the planet gears 100 is imparted only when the rollers 56 are being pivoted outward in a clockwise direction. Since the planets all mesh with the fixed sun gear 104, any rotation imparted to the planet gears 100 causes them to orbit about the fixed sun gear 104 and thus carry with them the hub 70. This imparts a substantially uniform rotary output movement to the hub 70 which is a combination of the cyclic pivotal movements of each of the planet gears 100.

As explained in detail in the above-mentioned patent application, the input-output ratio of a Waddington drive is proportional to the degree of eccentricity of the cam plate 44 with the ratio of maximum output speed occurring when the cam plate 44 is in its position of maximum eccentricity, as shown in FIG. 3 and minimum output speed when the cam plate 44 approaches concentricity with the input element 26. The output torque requirements are transmitted back by the rollers 56 to cam plate 44. This torque reaction produces a moment about center $I_2$ which urges the cam plate 44 in a counterclockwise direction toward a position of lower eccentricity. This movement is resisted by the spring 63 which urges the cam plate in the clockwise direction. It can be seen that the spring 63 and the torque reaction forces act against one another to vary the eccentricity of cam plate 44 to vary the input-output ratio to maintain a given input torque irrespective of the output torque requirements.

For positions of high eccentricity the portion of cam periphery 48 defined by segment 51 reciprocates rollers 56. For positions of minimum eccentricity the portion of cam periphery defined by segment 49 reciprocates the rollers 56. Therefore the different contours on the cam periphery reciprocate the rollers for different positions of eccentricity. The radius of curvature for the contour used during minimum eccentricity is greater than that for maximum eccentricity so that the rate of rise of the roller is lower. As a result, there is a greater constant velocity during the roller movement. This in turn produces smoother instantaneous output r.p.m. for conditions of minimum eccentricity.

The given level of input torque is adjustably selected by moving ring 69 relative to flange 71. Moving the ring 69 in a clockwise direction, as viewed in FIG. 2, increases the tension of spring 63 and thus the level of input torque required. Rapid cylic variations in the input torque caused by the cyclic nature of the effort applied to the pedals by an operator, are damped by the movement of pin 50 through the grease in the groove 42, thus maintaining a smooth transition from one ratio to another.

The modification of the drive as shown in FIG. 4 not only dampens out operator-induced variations in input torque but minimizes, if not eliminates, a phenomena called "rumble" which occurs when the drive is used to power an output element having a substantial degree of inertia, such as a bicycle wheel.

This modification consists of a ring gear 110 made integral with the ring 79' of flange 71'. The ring gear 110, having a substantial diameter, meshes with a gear 112 of substantially smaller diameter so that there is a significant speedup ratio between the two. Gear 112 is fixed on shaft 114 rotatable in an arm 116 by a bearing assembly 118. Arm 116 is suitably secured to the fork 14' of a bicycle. The opposite end of shaft 114 has a relatively heavy inertia wheel 120 suitably fixed on it.

During operation of this device rotation of input element 26' causes the inertia wheel 120 to rotate at a high rate of speed. The output element (in this case a bicycle wheel) tends to run to a constant r.p.m. This type of drive tends to produce an output r.p.m. that has a slight amount of instantaneous variation. Since the output element tends to resist this slight variation, the variation is reflected back to the input element in a reverse direction. This instantaneous reverse r.p.m. variation which would be felt as "rumble" by an operator, is effectively damped out by the substantial inertia of the wheel 120. Any variations in r.p.m. are thus taken up by the normal tolerances occuring in the drive. It has been found that an inertia wheel of approximately 1 lb. mass effectively eliminates rumble down to 20 r.p.m. Since the inertia wheel 120 also minimizes cycle-to-cycle variations in torque, the use of grease in the groove 42 is not necessary so that the O-rings may be eliminated.

FIG. 4 also shows an alternate arrangement for yieldably maintaining the rollers 56' against the periphery of cam 44' when the cam has the variation in contours described above. This arrangement comprises a coiled spring 122 retained within the center of tubular shaft 64'. Spring 122 has a first end 124 received in a bore 126 in the wall of shaft 64' and a second end 128 suitably secured in an end plate 130 fixed to housing 70'. Thus the springs apply a torsional force to shaft 64' which urges the rollers 56' into engagement with the periphery of cam 44'. This approach is preferable when the cam has non-circular contours.

In both of the drives described above the torque reaction of the drive is transmitted to the forks 14 and 16 through the sun gear 104. The effective radius of the sun gear relative to the shaft 12 is relatively small. This greatly minimizes the reaction torque moment applied to the forks 14 and 16 by the drive 10. With this arrangement it is possible to incorporate fork elements substantially lighter and more flexible without experiencing any significant amount of deformation. By positioning the planet gears 100 around a fixed sun gear, overrunning clutches 102 of a substantially greater size can be incorporated when compared to the overrunning clutches illustrated in the above-mentioned patent application. This in turn increases the torque-carrying capability of the drive.

While several preferred embodiments of the present invention have been described, it should be apparent to those skilled in the art that it may be provided in forms other than those shown without departing from the spirit and scope thereof.

Having thus described the invention what is claimed as novel and desired to be secured by Letters Patent of the United States is:

1. A stepless variable-stroke drive comprising:
   an input element journaled for rotation and having a generally cylindrical cam means displaceable between a first position wherein its effective center is eccentric with respect to the axis of rotation of said input element and a second position wherein the effective center is closer to said axis;
   an output element journaled for rotation;
   at least one planet gear journaled in said output element;
   a nonrotatable gear engaging said planet gear for providing a torque reaction therewith;
   crank arm means having a follower at one end engageable with said cam means for pivoting cyclic movement of the crank arm means about the other end thereof;
   a one-way clutch connecting the other end of said crank arm means to said planet thereby causing said planet to revolve about the rotational axis of said output element at an input-output speed ratio generally proportional to the distance of the effective center of the cam means from the axis of said input element; and
   means responsive to the torque across said drive for displacing said cam means between said positions.

2. A stepless variable-stroke drive as in claim 1 wherein said cam means is contoured around its periphery to produce a first rate of pivoting cyclic movement of the crank arms for said first position and a second lower rate of pivoting cyclic movement for said second position.

3. A stepless variable-stroke drive as in claim 1 wherein said input element comprises:
   an input element rotatable about a central axis having an integral cylindrical disc at one end, the axis of said disc being offset from said central axis; and
   a generally cylindrical cam having a circular opening by which said cam is journaled over said disc. the axis of said circular opening being offset from the effective center of said cam whereby rotation of said cam relative to said disc varies the distance of the effective center of said cam from said central axis.

4. A stepless variable-stroke drive as in claim 3 wherein the effective center of said cam is offset from the axis of said disc an amount equal to the offset between the axis of said disc and said central axis whereby said cam may be pivoted so that its effective center moves through a circular arc to a position of eccentricity with said central axis.

5. A stepless variable-stroke drive as in claim 3 wherein the exterior surface of said cam has first and second contours, the first contour acting to pivot said follower during positions of minimum eccentricity and the second contour pivoting said follower for positions of greater eccentricity.

6. A stepless variable-stroke drive as in claim 5 wherein said second contour is semicircular having its axis coincident with the effective center of said cam and the first contour being semicircular and having a radius greater than the radius of said second contoured surface, said contoured surfaces each extending for approximately 180° of the periphery of said cam.

7. A stepless variable-stroke drive as in claim 3 further comprising means for damping the rotation of said cam relative to said disc whereby variations in input-output ratio in response to rapid cyclic changes of input torque are effectively damped.

8. A stepless variable-stroke drive as in claim 7 wherein said damping means comprises:
   an arcuate groove formed in the periphery of said disc;
   a pin secured to said cam and extending inward into said groove;

means for sealing the periphery of said groove, said groove being fillable with a viscous material thereby damping movement of said cam through said groove in response to rotation of said cam relative to said disc.

9. A stepless variable-stroke drive as in claim 8 wherein said sealing means comprises circumferential grooves in the periphery of said disc on both sides of said arcuate groove and resilient O-rings received in said grooves for sealingly engaging the circular opening in said cam.

10. A stepless variable-stroke drive as in claim 3 wherein said torque-responsive means comprises:
an element nonrotatable with respect to said rotatable input element;
a second element journaled on said input element and relatively rotatable with said cam; and
yieldable urging means connected between said first and second elements for urging said cam to a position of maximum eccentricity.

11. A stepless variable-stroke drive as in claim 10 wherein said cam has a tab extending in an axial direction, said second element comprises a generally cylindrical element having a central opening for journaling about said input element and a notch on the periphery for receiving one end of said yieldable urging means, said second element having a radially extending slot receiving said tab, whereby said second element rotates with said cam irrespective of the variation in the distance of the tab on said cam from the axis of rotation of said second element.

12. A stepless variable-stroke drive as in claim 11 wherein said first element comprises a disc with an outer flange having a notch for receiving the opposite end of said yieldable urging means and wherein said yieldable urging means comprises a coiled spring with a rectangular cross section having a first end connected to the notch in said second element and a second end connected to the notch in said first element.

13. A stepless variable-stroke drive as in claim 12 wherein said first element comprises means for adjustably positioning said spring-receiving notch of said first element relative to the axis of said input element.

14. A stepless variable-stroke drive in claim 13 wherein:
said first element comprises a flange secured to said input element and an outer ring supported by and rotatable around said flange, said outer ring having said spring-receiving notch;
said adjustable means comprises a peripheral surface formed on said flange, an arm pivotally secured to an element on said ring, the distance from the pivotal mounting of said arm to the end thereof being greater than the distance from the pivotal mounting radially inward to said peripheral surface, and means yieldably urging said arm into engagement with said peripheral surface thereby holding said ring relative to said flange by friction.

15. A stepless variable-stroke drive as in claim 14 wherein said peripheral surface on said flange comprises an integral ring having a plurality of spaced notches around its periphery providing a detent for the end of said arm.

16. A stepless variable-stroke drive as in claim 1 wherein:
said cam means has a generally cylindrical outer follower engaging surface;
said followers comprise rollers journaled to said crank arm means and engaging said cam surface whereby movement of said cam means pivots said followers; and
means for maintaining said followers in engagement with said cylindrical cam surface.

17. A stepless variable-stroke drive as in claim 16 wherein said means for maintaining said rollers in engagement with said cam surface comprises a circular ring enclosing the periphery of said rollers and having a predetermined diameter which maintains the rollers in engagement with said cylindrical cam surface.

18. A stepless variable-stroke drive as in claim 17 further comprising a one-way clutch between said input sprocket and said input element.

19. A stepless variable-stroke drive as in claim 18 wherein said driving means comprises:
a first gear concentric with an fixed to said input element; and
a second gear concentric with and fixed to said inertia wheel and meshing with said first gear, the diameter of said first gear being substantially greater than the diameter of said second gear thereby providing a substantial speedup ratio.

20. A stepless variable-stroke drive as in claim 16 wherein said means for maintaining the rollers in engagement with said cam surface comprises torsion springs connected to one end of said crank arm means and to said output element for pivoting said followers into engagement with said cam surface.

21. A stepless variable-stroke drive as in claim 1 wherein said input element comprises a drive sprocket adaptable to engage an operator-driven chain and wherein said output element comprises the hub of a spoked vehicle wheel.

22. A stepless variable-stroke drive as in claim 1 further comprising:
an inertia wheel journaled for rotation; and
means connected to said input element for driving said inertia wheel at a high rate of speed in response to rotation of said input element.

* * * * *

UNITED STATES PATENT OFFICE
CERTIFICATE OF CORRECTION

PATENT NO. : 3,874,253
DATED : April 1, 1975
INVENTOR(S) : Clive Waddington

It is certified that error appears in the above-identified patent and that said Letters Patent are hereby corrected as shown below:

Col. 2, line 52, "pin 50 and 180° away" should read

-- pin 50 is 180° away -- .

Signed and sealed this 17th day of June 1975.

(SEAL)
Attest:

RUTH C. MASON
Attesting Officer

C. MARSHALL DANN
Commissioner of Patents
and Trademarks